(12) United States Patent
Anshel et al.

(10) Patent No.: US 10,459,690 B1
(45) Date of Patent: Oct. 29, 2019

(54) SIDE CHANNEL ATTACK PREVENTION

(71) Applicant: SECURERF CORPORATION, Shelton, CT (US)

(72) Inventors: Iris Anshel, Tenafly, NJ (US); Dorian Goldfeld, Tenafly, NJ (US)

(73) Assignee: SecureRF Corporation, Shelton, CT (US)

( * ) Notice: Subject to any disclaimer, the term of this patent is extended or adjusted under 35 U.S.C. 154(b) by 125 days.

(21) Appl. No.: 15/869,858

(22) Filed: Jan. 12, 2018

Related U.S. Application Data (60) Provisional application No. 62/446,721, filed on Jan. 16, 2017.

(51) Int. Cl.
*G06F 7/58* (2006.01)
(52) U.S. Cl.
CPC ..................................... *G06F 7/58* (2013.01)
(58) Field of Classification Search
None
See application file for complete search history.

(56) References Cited

U.S. PATENT DOCUMENTS

| | | | |
|---|---|---|---|
| 7,136,484 B1 * | 11/2006 | Koh | H04L 9/0662 380/28 |
| 2002/0001382 A1 * | 1/2002 | Anshel | H04L 9/0841 380/30 |
| 2006/0045264 A1 * | 3/2006 | Kocher | G06F 21/556 380/37 |
| 2006/0280308 A1 * | 12/2006 | Anshel | H04L 9/0841 380/285 |
| 2010/0036900 A1 * | 2/2010 | Ross | G06F 7/58 708/254 |
| 2018/0097618 A1 * | 4/2018 | Kumar | H04L 9/0662 |

* cited by examiner

*Primary Examiner* — Michael D. Yaary
(74) *Attorney, Agent, or Firm* — Moritt Hock & Hamroff LLP; Bret P. Shapiro (57) ABSTRACT

A side channel attack prevention system may use one or more of a function mutation generator, an element selector generator and/or a subword replacement module to produce a hardened result. The function mutation generator may evaluate a mutated function. The element selector generator may select a central group element in a group and insert that central group element within the group. The subword replacement module may identify a relation in a group and insert that relation in a random location of the group.

20 Claims, 8 Drawing Sheets

SIDE CHANNEL ATTACK PREVENTION

CROSS-REFERENCE TO RELATED APPLICATION

This application claims priority to Provisional Application No. 62/446,721 filed Jan. 16, 2017, titled "Preventing Side Channel Attacks on an Encryption System", the entirety of which is hereby incorporated by reference.

BACKGROUND

An encryption system may be attacked in various ways: by brute computing force, by exploiting a theoretical weakness of an algorithm of the encryption system, or by a side channel attack based on information related to the existence of a physically observable phenomenon associated with a physical implementation of the encryption or an algorithm of the encryption system. Side channel attacks may be based on heat and electromagnetic emissions of electronic circuitry executing the cryptosystem. Side channel attacks may utilize information related to timing, electromagnetic leaks, and power consumption, and may be based on statistical models. Side channel attacks may be based upon reversed engineering of electronic circuitry executing the encryption or an algorithm of the encryption system to deduce how the circuitry is working and what data the circuitry is processing.

SUMMARY OF THE INVENTION

One embodiment of the invention is a system effective to harden an input to produce a hardened result. The system may comprise a pseudo random number generator effective to generate a pseudo random number. The system may further comprise a mutation data generator configured to be in communication with the pseudo random number generator, the mutation data generator effective to receive the pseudo random number, receive a list of mutations, and produce mutated function data. The system may further comprise an E-multiplication module configured to be in communication with the mutation data generator, the E-multiplication module effective to receive the mutated function data, receive E-multiplication data, and receive an E-multiplication input, the E-multiplication module being effective to process the mutated function data, process the E-multiplication data, and process the E-multiplication input to produce E-multiplication mutated function data. The system may further comprise a correction factor evaluator configured to be in communication with the mutation data generator, the correction factor evaluator effective to receive the E-multiplication input, and receive the mutated function data, the correction factor evaluator effective to process the E-multiplication input, and process the mutated function data to produce a correction factor. The hardened result may be based on the E-multiplication mutated function data and the correction factor.

Another embodiment of the invention includes a system effective to harden an input to produce a hardened result. The system may comprise a pseudo random number generator effective to generate a pseudo random number. The system may further comprise an element selector configured to be in communication with the pseudo random number generator, the element selector effective to receive the pseudo random number and a group and select a group element from the group. The system may further comprise an element insertion module configured to be in communication with the element selector, the element insertion module being effective to receive the pseudo random number, the group element, and a group expression, the element insertion module effective to process the pseudo random number, process the group element, and process the group expression to modify the group expression and produce the hardened result.

Another embodiment of the invention includes a system effective to harden an input to produce a hardened result. The system may comprise a pseudo random number generator effective to generate a pseudo random number. The system may further comprise a subword search and replacement selector configured to be in communication with the pseudo random number generator, the subword search and replacement selector effective to receive the pseudo random number. The system may further comprise a relation insertion module configured to be in communication with the pseudo random number generator, the relation insertion module effective to receive a group expression and the pseudo random number, the relation insertion module effective to process the pseudo random number and the group expression to select a selected relation of the group and insert the selected relation at a random location within the group expression to produce a new expression. The system may further comprise a subword rewritten expression generator configured to be in communication with the relation insertion module and the subword search and replacement selector, the subword rewritten expression generator effective to receive the new expression and identify a subword in the new expression, the subword rewritten expression generator further effective to forward the subword to the subword search and replacement selector. The subword search and replacement selector may be further effective to receive the subword and identify an identified relation of the group in which the subword appears, the subword search and replacement selector is further effective to forward the identified relation to the subword rewritten expression generator. The subword rewritten expression generator may be further effective to receive the identified relation and output the identified relation as the hardened result.

BRIEF DESCRIPTION OF THE FIGURES

The foregoing and other features of this disclosure will become more fully apparent from the following description and appended claims taken in conjunction with the accompanying drawings. Understanding that these drawings depict only some embodiments in accordance with the disclosure and are therefore not to be considered limiting of its scope, the disclosure will be described with additional specificity and detail by reference to the accompanying drawings in which:

DETAILED DESCRIPTION OF THE PREFERRED EMBODIMENT(S)

In the following detailed description, reference is made to the accompanying drawings which form a part thereof. In the drawings, similar symbols typically identify similar components unless context indicates otherwise. The illustrative embodiments described in the detailed description, drawings and claims are not meant to be limiting. Other embodiments may be utilized and other changes may be made without departing from the spirit or scope of the subject matter presented herein. It will be readily understood that the aspects of the present disclosure as generally described herein and as illustrated in the accompanying figures can be arranged, substituted, combined, separated and/or designed in a wide variety of different configurations all of which are explicitly contemplated herein.

Figure 1:
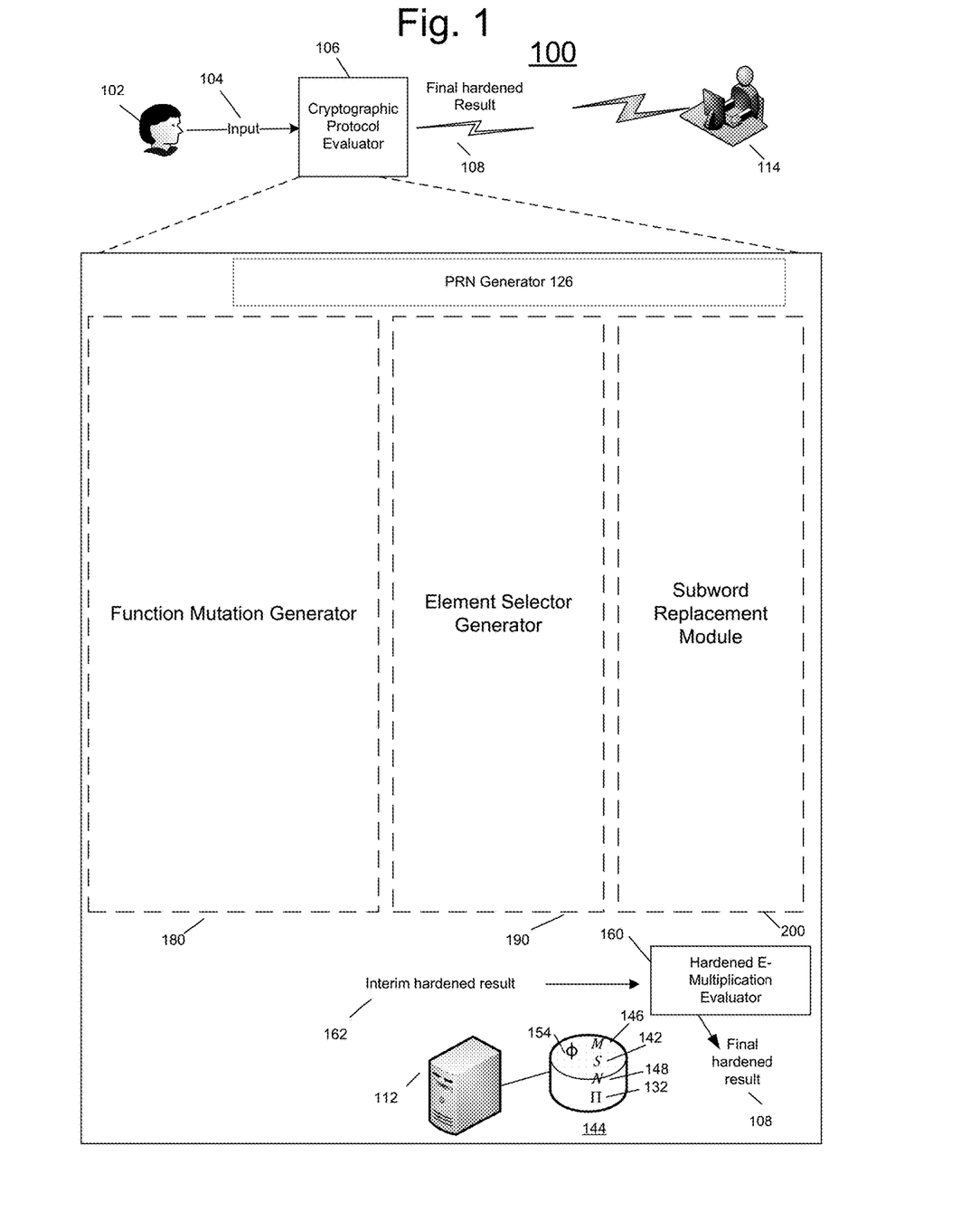
FIG. 1 is a system drawing of a side channel attack prevention system in accordance with an embodiment of the invention.

FIG. 1 is a system drawing of a side channel attack prevention system 100 in accordance with an embodiment of the invention. As discussed herein, a user 102 may use a cryptographic protocol evaluator 106 to process an input 104 to produce a final hardened result 108. Encryption protocol evaluator 106 could be, for example, an encryption module, a digital signature module or a key agreement module, any one of which may utilize a hardened E-multiplication evaluator 160 as discussed herein. Final hardened result 108 may be hardened against a potential side channel attack by a malicious actor 114 and it may be infeasible to reverse hardened result 108 through a side channel attack. Cryptographic protocol evaluator 106 may include a processor 112 and a memory 144 configured to be in communication with each other. Processor 112 may be a component of a computing device such as a personal computer, a laptop computer, a mobile device, a cellular phone, a tablet computer, a wearable device, a radio frequency transmitter or receiver, etc. In some examples, processor 112 may be a sensor, a microprocessor, a microcontroller, an arithmetic logic unit, a radio frequency identification (RF-ID) receiver, a programmable circuit such as a field programmable gate array, an NFC device etc. Cryptographic protocol evaluator 106 may include a pseudo random number generator 126, a function mutation generator 180, an element selector generator 190, and/or a subword replacement module 200. Processor 112 may be effective to selectively utilize one or more of function mutation generator 180, element selector generator 190 and/or subword replacement module 200 to produce an interim hardened result 162. Cryptographic Protocol Evaluator 106 may include hardened E-multiplication evaluator 160. Hardened E-multiplication evaluator 160 may be effective to evaluate E-multiplication using interim hardened result 162 to produce final hardened result 108. Memory 144 may store a group S 142, a group M 146, a group N 148, a function Π 132, and a function φ 154. E-multiplication, may be based on:

Group 146 M on which group S 142 may act,

Group N 148 which may possess a second group operation which may enable a device to randomize the execution of E-multiplication, A one-way function Π: M→N that may be efficiently computable but may be difficult to reverse. E-multiplication ★ defines a right action of group M⋊S on the group N×S and may be given by the following expression:

$(n,s) \star (m_1,s_1) = (n\Pi(^s m_1), ss_1)$.

Function Π may be a one-way function that is computable but difficult or infeasible to reverse. In an example, an instance of a one-way function based symmetric encryption protocol utilizes an Algebraic Eraser. An Algebraic Eraser may include a specified 6-tuple (M⋊S, N, Π, E, A, B) where:

M and N are monoids,

S is a group that acts on M (on the left),

M⋊S denotes the semi-direct product,

A and B denote submonoids of M⋊S, and

Π denotes a monoid homomorphism from M to N. The E-function, also called E-multiplication, is defined by $E: (N \times S) \times (M \rtimes S) \to (N \times S)$ $(n,s) \star (m_1,s_1) = (n\Pi(^s m_1), ss_1)$ It is observed that the E-function satisfies the following identity:

$E((n,s), ((m_1,s_1) \cdot (m_2,s_2))) = E(E((n,s),(m_1,s_1)),(m_2,s_2))$.

The above E-function identity enables the following definition of a right action: given an arbitrary element $(n,s) \in N$, and $(m,s_1) \in M$, define the right action of $(m,s_1)$ on n=(n,s) by $(n_0,s_0) \star (m,s_1) = E((n_0,s_0),(m,s_1)) = (n_0\Pi(^{s_0}m_1), s_0 s_1)$.

Figure 2:
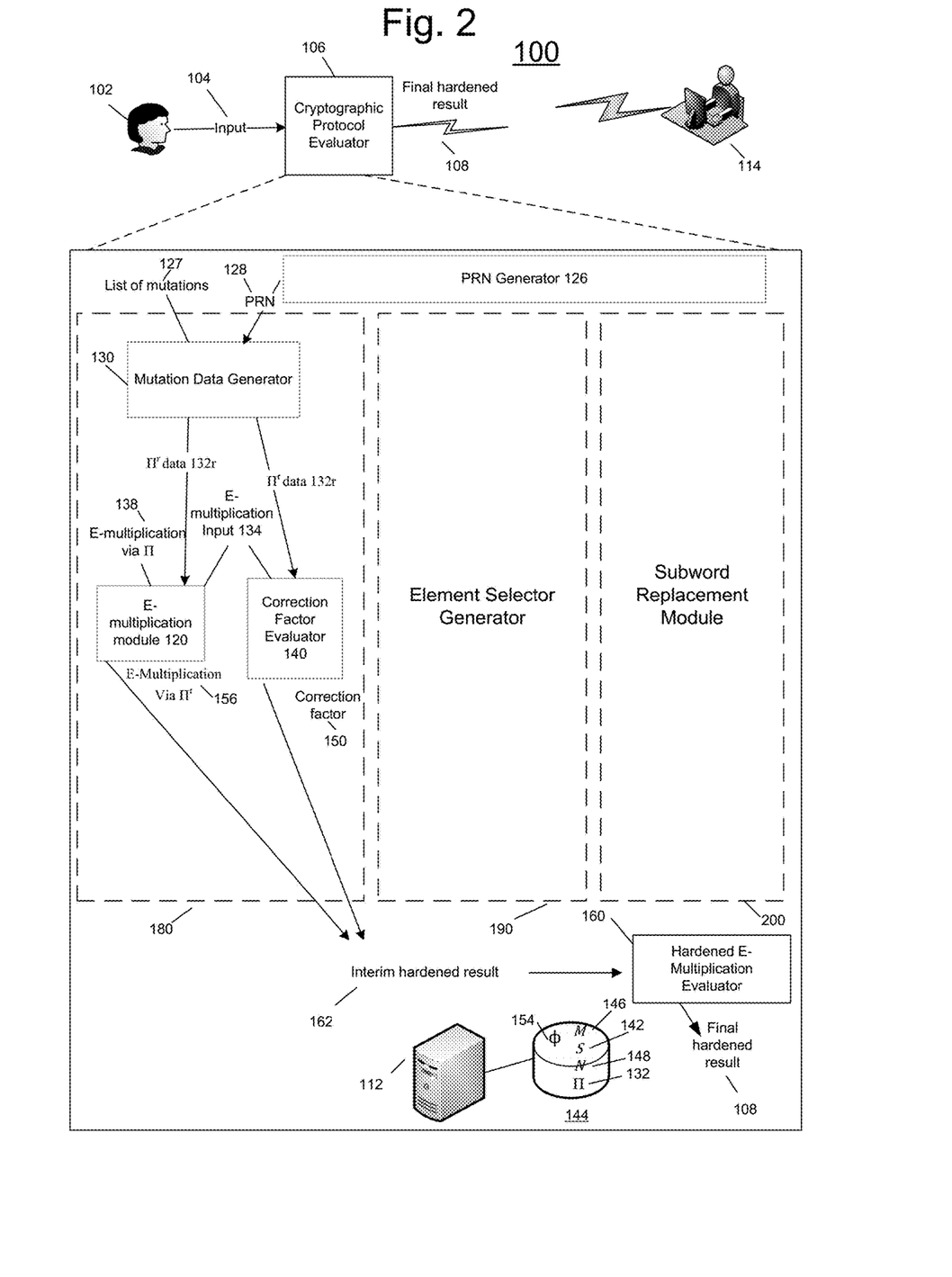
FIG. 2 is a system drawing of a side channel attack prevention system in accordance with an embodiment of the invention.

FIG. 2 is a system drawing of a side channel attack prevention system in accordance with an embodiment of the invention. Function mutation generator 180 may include a mutation data generator 130, an E-multiplication module 120 which receives E-multiplication via Π input data, and/or a correction factor evaluator 140 all configured to be in communication with one another. System 100 may be effective to prevent side channel attacks and make reversing E-multiplication infeasible, by randomly mutating the function FI 132 producing the function Π$^r$ 132r.

Mutation Data Generator 130 may receive a pseudo random number 128 from Pseudo Random Number Generator (PRNG) 126 and a list of possible mutations 127. Mutation Data Generator 130 may output Π$^r$ data 132r that may facilitate E-multiplication via function Π$^r$ 132r. E-multiplication module 120 may receive Π$^r$ data 132r. E-multiplication module 120 may also receive E-multiplication via Π data 138 and E-multiplication input data 134. In an example, E-multiplication via Π data 138 may include the specified elements in E-multiplications i.e., the monoids M,N and the action of S on M. E-multiplication input 134 may include the ordered pair $(n_0,s_0)$, and the element $(m,s_1)$. E-multiplication module 120 may process Π$^r$ data 132r, E-multiplication via Π data 138, and E-multiplication input 134 to execute E-multiplication via Π$^r$ 132r and produce E-multiplication via Π$^r$ data 156. Correction factor evaluator 140 may receive and process Π$^r$ data 132r and E-multiplication input 134 to produce a correction factor 150. Hardened E-multiplication Evaluator 160 may receive and process E-multiplication module via Π$^r$ data 156 and correction factor 150 to produce final hardened result 162 that may be used for cryptographic applications. Final hardened result 108 may be hardened against a potential side channel attack by malicious actor 114 and may make reversing E-multiplication infeasible. The value of interim hardened result 162, produced from correction factor 150 and E-multiplication module via Π' data 156, which may be used to facilitate cryptographic primitives, may be recovered by using the function Π' provided that there is a priori knowledge of the function Π

E-multiplication in system 100 may be braid based. A braid based E-multiplication module may include:

A braid group $B_n$ for a fixed integer n, with generators $\{b_1, b_2, \ldots, b_{n-1}\}$ which may be subject to the relations $$b_i b_{i+1} b_i = b_{i+1} b_i b_{i+1}, (i=1, \ldots, n-1),$$

and $$b_i b_j = b_j b_i \ (i,j \text{ with } |i-j| \geq 2),$$

Permutation group 142 $S_n$,
A finite field $F_q$ of q elements,
A set of n invertible elements (T-values) in $F_q$, denoted $\{\tau_1, \tau_2, \ldots, \tau_n\}$,
Monoid $\mathcal{M}$ 146 of n×n matrices with n-variable Laurent polynomial entries on which S acts,
Group N 148 of n×n over the finite field $F_q$,
Homomorphism Π: $\mathcal{M} \rightarrow N$ 132, which replaces variables in a matrix with corresponding T-values
Homomorphism φ: $B_n \rightarrow \mathcal{M} \rtimes S$, $\phi(\beta)=(CB(\beta), \sigma_\beta)$ 154, where CB(β) is the colored Burau matrix associated with β and $\sigma_\beta$ is the permutation associated with β.

In an example, the braid group may be $B_4$. Matrices $CB(b_i)$ for i=1, 2, 3 may be defined as follows:

$$\begin{pmatrix} -t_1 & 1 & 0 & 0 \\ 0 & 1 & 0 & 0 \\ 0 & 0 & 1 & 0 \\ 0 & 0 & 0 & 1 \end{pmatrix}, \begin{pmatrix} 1 & 0 & 0 & 0 \\ t_2 & -t_2 & 1 & 0 \\ 0 & 0 & 1 & 0 \\ 0 & 0 & 0 & 1 \end{pmatrix}, \begin{pmatrix} 1 & 0 & 0 & 0 \\ 0 & 1 & 0 & 0 \\ 0 & t_3 & -t_3 & 1 \\ 0 & 0 & 0 & 1 \end{pmatrix}.$$

Permutations associated to each $b_i$ may map i→i+1, i+1→i, and may leave the remainder of the domain fixed. The case of $CB(b_i^{-1})$ for i=1, 2, 3 may be similar. The case of $B_n$ may be similar.

System 100, in order to prevent side channel attacks, may obtain final hardened result 108 of Hardened E-multiplication Evaluator 160 which may be $$(n,s) \star (CB(\beta), \sigma_\beta) = (n\Pi({}^s CB(\beta)), s\sigma_\beta),$$

where $\beta = b_{i_1}^{\epsilon_1} b_{i_2}^{\epsilon_2} \ldots b_{i_k}^{\epsilon_k}$, is obtained iteratively by obtaining interim hardened result 162, for each of the braid generators or their inverses which may appear in the input braid β.

Pseudo random number 128 from PRNG 126, may be sent to Mutation Data Generator 130, which may produce a of set n randomly chosen field elements $\{\rho_1, \rho_2, \ldots, \rho_n\}$ which satisfy the property $$\rho_i \cdot \tau_i + \tau_i^2 \neq 0, (i=1, \ldots, n).$$

Π' data 132r output from Mutation Data Generator 130, $\{\rho_1, \rho_2, \ldots \epsilon_{i_j} \rho_n\}$, along with E-multiplication input 134, (n,s), $(CB(b_{i_j}^{\epsilon_{i_j}}), \sigma_{b_{i_j}})$, may be forwarded to E-multiplication module 120. The output of E-multiplication module 120 may be $$(n\Pi'({}^s CB(b_{i_j}^{\epsilon_{i_j}})), s\sigma_{b_{i_j}})$$

where the function Π' 132r may indicate E-multiplication with the mutated T-values $$\{\tau_1 + \rho_1, \tau_2 + \rho_2, \ldots, \tau_n + \rho_n\}.$$

Π' data 132r output from Mutation Data Generator 130, $\{\rho_1, \rho_2, \ldots \epsilon_{i_j} \rho_n\}$, along with E-multiplication input 134, (n,s), $(CB(b_{i_j}^{\epsilon_{i_j}}), \sigma_{b_{i_j}})$ may be forwarded to Correction Factor Evaluator 140. Correction Factor Evaluator 140 may output correction factor 150 which may include the difference between the first component of the output of E-multiplication with the original T-values, and the first component of the output of E-multiplication with the mutated T-values. Correction Factor Evaluator 140 may output the difference (correction factor 150) without evaluating the E-multiplication with the original T-values, thus preserving the randomness of the methods and the side channel attack resistance.

In an example correction factor evaluator 140 may produce the following correction factor 150:

$$(n, s) = \left( \begin{pmatrix} n_{1,1} & n_{1,2} & n_{1,3} \\ n_{2,1} & n_{2,2} & n_{2,3} \\ n_{3,1} & n_{3,2} & n_{3,3} \end{pmatrix}, s \right),$$

and $$(CB(b_2), \sigma_{b_2}) = \left( \begin{pmatrix} 1 & 0 & 0 \\ t_2 & -t_2 & 0 \\ 0 & 0 & 1 \end{pmatrix}, (1\ 3\ 2) \right),$$

where (1 3 2) denotes the permutation that maps 1→1, 2→3, 3→2,
correction factor 150 of Correction Factor Evaluator 140 may be given by $$\begin{pmatrix} n_{1,2} \cdot \rho_{s(2)} & -n_{1,2} \cdot \rho_{s(2)} & 0 \\ n_{2,2} \cdot \rho_{s(2)} & -n_{2,2} \cdot \rho_{s(2)} & 0 \\ n_{3,2} \cdot \rho_{s(2)} & -n_{3,2} \cdot \rho_{s(2)} & 0 \end{pmatrix}.$$

The general case may be similar to the example. Correction factor 150 may be independent of the original T-values, and may be dependent on the output of Mutation Data Generator 130, which itself may possess randomness features from pseudo random number 128 output of pseudo random number generator 126.

Figure 3:
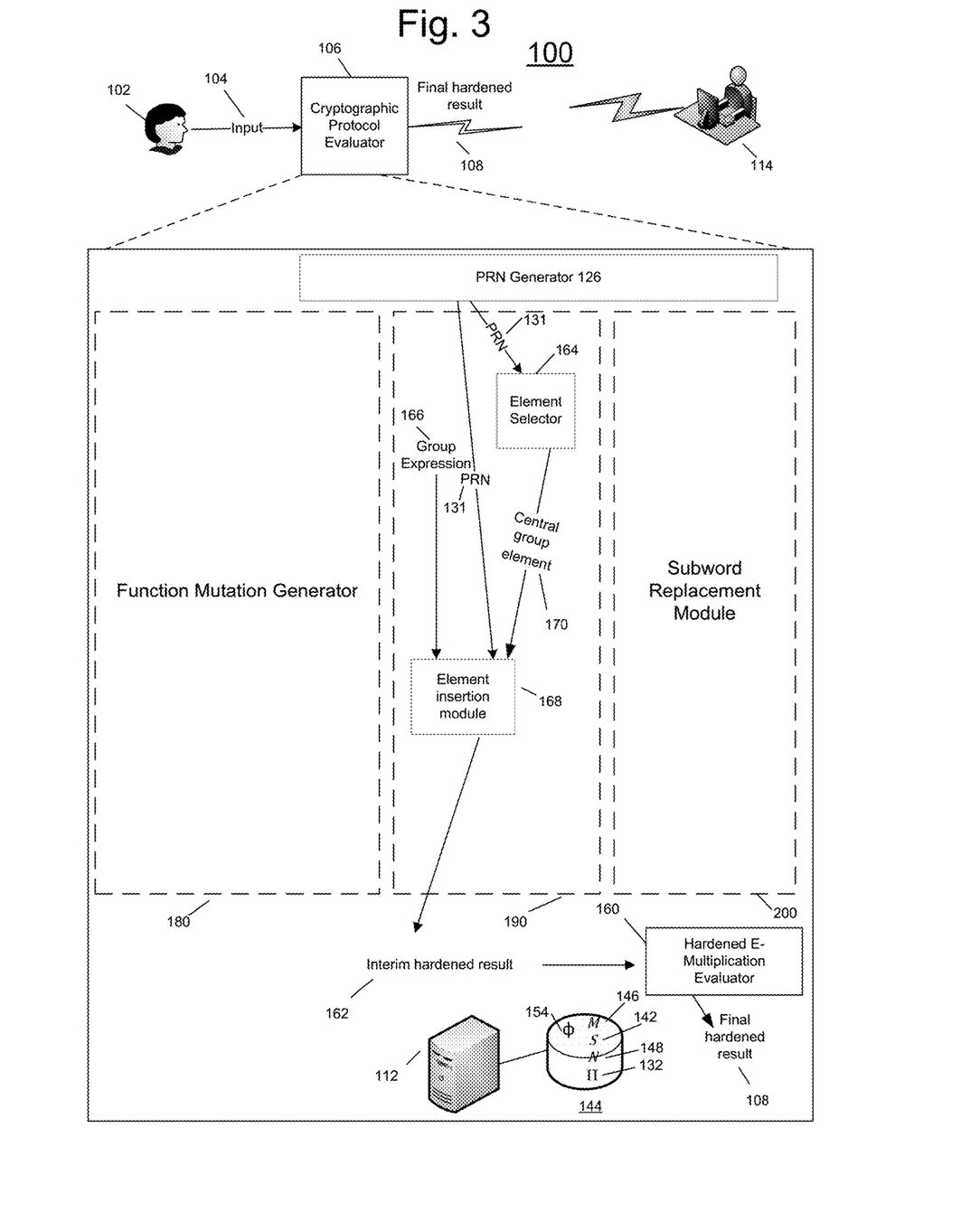
FIG. 3 is a system drawing of a side channel attack prevention system in accordance with an embodiment of the invention.

FIG. 3 is a system drawing of a side channel attack prevention system in accordance with an embodiment of the invention. Element selector generator 190 may include a central element selector 164, and an element insertion module 168 configured to be in communication with pseudo random number generator 126. Central element selector 164 may be effective to receive a pseudo random number 131 from pseudo random number generator 126 and receive group M. Pseudo random number 131 may be the same as, or different from, pseudo random number 128. Central element selector 164 may process pseudo random number 131 and select a central group element 170 from group M. Element insertion module 168 may receive central group element 170 and pseudo random number 131. Element insertion module 168 may further receive a group expression 166, such as an expression included in the group M. Group expression 166 may be, for example, a second input to E-multiplication in the braid setting and/or may be a private key. Element insertion module 168 may process pseudo random number 131, and central group element 170 to modify group expression 166 and produce interim hardened result 162.

Cryptographic protocol evaluator 106 may harden the evaluation of E-multiplication against side channel attacks by executing group element generator expression manipulations enabled by central element selector 164 and making reversing of E-multiplication infeasible. Group M may be specified by a set of generators $\{x_1, x_2, \ldots, x_n\}$: if $m \in M$, then $$m = x_{i_1}^{\epsilon_1} \cdot x_{i_2}^{\epsilon_2} \ldots x_{i_k}^{\epsilon_k},$$

where $\epsilon_i = \pm 1$, and $x_{i_j} \in \{x_1, x_2, \ldots, x_n\}$. A group element c may be termed central in the group provided the identity $$c \cdot m = m \cdot c$$

for any element $m \in M$. Central element selector 164 may receive input from pseudo random number generator 126 and may produce a central element c in the group M. This element c may be forwarded to element insertion module 168.

In an example, an element $m = x_{i_1}^{\epsilon_1} \cdot x_{i_2}^{\epsilon_2} \ldots x_{i_k}^{\epsilon_k}$, may be a first component of an input to E-multiplication and whose expression may need to be obscured to prevent a side channel attack, is forwarded to element insertion module 168. Pseudo random number 131 may be forwarded to element insertion module 168. Element insertion module 168 may enable the choice of insertion locations for the output c of the element selector 164 and the inverse of the element c. An output of element insertion module 168 is given by $$x_{i_1}^{\epsilon_1} \cdot \ldots \cdot x_{i_{a-1}}^{\epsilon_{a-1}} \cdot c \cdot x_{i_a}^{\epsilon_a} \ldots x_{i_{b-1}}^{\epsilon_{b-1}} \cdot c^{-1} \cdot x_{i_b}^{\epsilon_b} \ldots x_{i_k}^{\epsilon_k}.$$

In some cases, the element c may be inserted at the beginning of the expression, and in some cases the inverse of the element c may be inserted at the end of the expression. In some cases the output of element insertion module 168 may be used as a group expression for a subsequent execution of other modules and/or generators discussed herein. In some cases multiple iterations of the above selecting, inserting, etc. processes may be performed.

In examples where E-multiplication is braid based, and the braid group is $B_n$, with generators $\{b_1, b_2, \ldots, b_{n-1}\}$ which may be subject to the relations $$b_i b_{i+1} b_i = b_{i+1} b_i b_{i+1}, (i=1,\ldots,n-1),$$

and $$b_i b_j = b_j b_i \ (i, j \text{ with } |i-j| \geq 2),$$

central element selector 164 may output elements of the form $$(b_1 b_2 \ldots b_{n-1})^{kn},$$

where $k \in \mathbb{Z}$, $k \neq 0$. In some cases the element selector 164 may output elements of the form $$(\underbrace{b_1 b_2 \ldots b_{n-1} \cdot b_1 b_2 \ldots b_{n-2} \cdot b_1 b_2 \ldots b_{n-3} \cdots b_1}_{2k}),$$

where again $k \in \mathbb{Z}$, $k \neq 0$.

Figure 4:
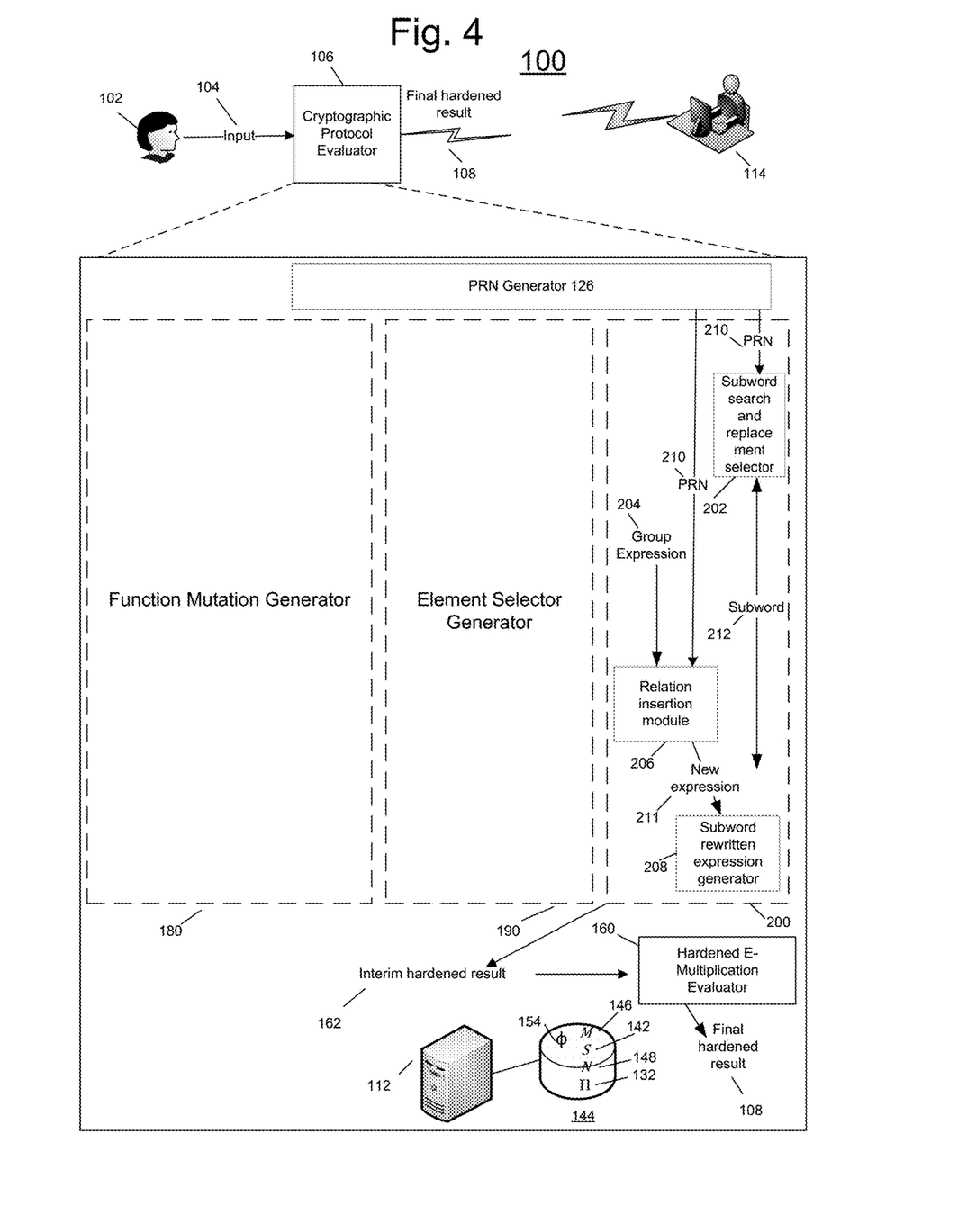
FIG. 4 is a system drawing of a side channel attack prevention system in accordance with an embodiment of the invention.

FIG. 4 is a system drawing of a side channel attack prevention system in accordance with an embodiment of the invention. Subword replacement module 200 may include a subword search and replacement selector 202, a relation insertion module 206 and a subword rewritten expression generator 208 configured to be in communication with pseudo random number generator 126. Subword search and replacement selector may be configured to receive a pseudo random number 210 from pseudo random number generator 126. Pseudo random number 210 may be the same as, or different from, pseudo random number 128 and/or pseudo random number 131.

Cryptographic protocol evaluator 106 may harden the evaluation of E-multiplication against side channel attacks and make reversing E-multiplication infeasible by executing group element generator expression manipulations. Relation insertion module 206 may receive group expression 204 that may need to be obscured in the course of hardening the evaluation of E-multiplication against side channel attacks. Group expression 204 may be, for example, a second input to E-multiplication in the braid setting and/or may be a private key. In addition, relation insertion module 206 may receive pseudo random number 210. Using these inputs, relation insertion module 206 may select a relation of the group and insert the selected relation at a random location within the group expression to produce a new expression 211. For example, if the group expression is given by $$m = x_{i_1}^{\epsilon_1} \cdot x_{i_2}^{\epsilon_2} \ldots x_{i_k}^{\epsilon_k},$$

and the relation of the group is denoted $r = x_{j_1}^{\delta_1} \cdot \ldots \cdot x_{j_{k'}}^{\delta_{k'}}$, then relation insertion module 206 may output the new expression $$x_{i_1}^{\epsilon_1} \cdot x_{i_2}^{\epsilon_2} \ldots x_{i_\mu}^{\epsilon_\mu} \cdot x_{j_1}^{\delta_1} \cdot \ldots \cdot x_{j_\lambda}^{\delta_\lambda} \cdot x_{i_{\mu+1}}^{\epsilon_{\mu+1}} \cdot \ldots \cdot x_{i_k}^{\epsilon_k},$$

where μ may be dependent on the output of PRNG 210.

In some examples, the relation inserted into the group expression may be a cyclic permutation of one of the specified groups relations. In some cases the relation may be a group generator followed by its inverse, or an inverse of a group generator followed by the group generator itself. New expression 211 is forwarded to subword rewritten expression generator 208.

Subword rewritten expression generator 208 may identify and forward to subword search and replacement selector 202, a subword h 212 which may take the form $$h = x_{i_\nu}^{\epsilon_\nu} \ldots x_{i_\mu}^{\epsilon_\mu} \cdot x_{j_1}^{\delta_1} \ldots x_{j_\lambda}^{\delta_\lambda},$$

or may take the form $$h = x_{i_\gamma}^{\delta_\gamma} \ldots x_{j_\lambda}^{\delta_\lambda} \cdot x_{i_{\mu+1}}^{\epsilon_{\mu+1}} \ldots x_{i_\theta}^{\epsilon_\theta}.$$

Subword search and replacement selector 202 may receive subword h 212 of the above form and identify a relation of the group in which h appears i.e., there is a relation $r_1$, such that $r_1 = w_1 \cdot h \cdot w_2$, where $w_1, w_2$ are expressions in the group generators. In some cases there may be more than one such relation $r_1$. In some cases one or both of the group expressions $w_1, w_2$ may be the empty expression. Subword search and replacement selector 202 selects a choice of $r_1$, and forwards the group expression $w_1^{-1} \cdot r_1 \cdot w_2^{-1} = h$ back to subword rewritten expression generator 208 which replaces h by the product $w_1^{-1} \cdot r_1 \cdot w_2^{-1}$. The result of this substitution is the final output of subword rewritten expression generator 208, which may be interim hardened result 162. In some cases, the exchange between subword search and replacement selector 202 and subword rewritten expression generator 208 may occur multiple times. The number of iterations will be determined by the perceived level of threat from a side channel attack.

In examples where E-multiplication is based on the braid group $B_n$, the generators may be taken to be $\{b_1, b_2, \ldots, b_{n-1}\}$, and the relations may be given by $b_i b_{i+1} b_i = b_{i+1} b_i b_{i+1}, (i=1, \ldots, n-1),$ and $b_i b_j = b_j b_i (i,j \text{ with } |i-j| \geq 2).$ Both relation insertion module 206 and subword search and replacement selector 202 may use the relations in the form $b_i b_{i+1} b_i b_{i+1}^{-1} b_i^{-1} b_{i+1}^{-1} = 1, b_i b_j b_i^{-1} b_j^{-1} = 1.$ In addition, subword search and replacement selector 202 may use any of the cyclic permutations of these relations: for example $b_j^{-1} b_i b_j b_i^{-1}.$ The first output of relation insertion module 206 may be the insertion of the relation $b_j^{-1}$ into an expression $m = b_{i_1}^{\epsilon_1} \cdot b_{i_2}^{\epsilon_2} \ldots b_{i_k}^{\epsilon_k},$ yielding the new expression $m = b_{i_1}^{\epsilon_1} \cdot b_{i_2}^{\epsilon_2} \ldots b_{i_\mu}^{\epsilon_\mu} \cdot b_j^{-1} \cdot b_j \cdot b_{i_{\mu+1}}^{\epsilon_{\mu+1}} \ldots b_{i_k}^{\epsilon_k}.$ Subword search and replacement selector 202 may search for a relation of the braid group that contains either the subword $h = b_{i_\mu}^{\epsilon_\mu} \cdot b_j^{-1},$ or the subword $h = b_j \cdot b_{i_{\mu+1}}^{\epsilon_{\mu+1}}.$ The result of substituting the h in the new expression for m may be to randomize which generator of the braid group appears at any given place in the expression. Such randomization may harden the evaluation of E-multiplication and may prevent side channel attacks.

Figure 5:
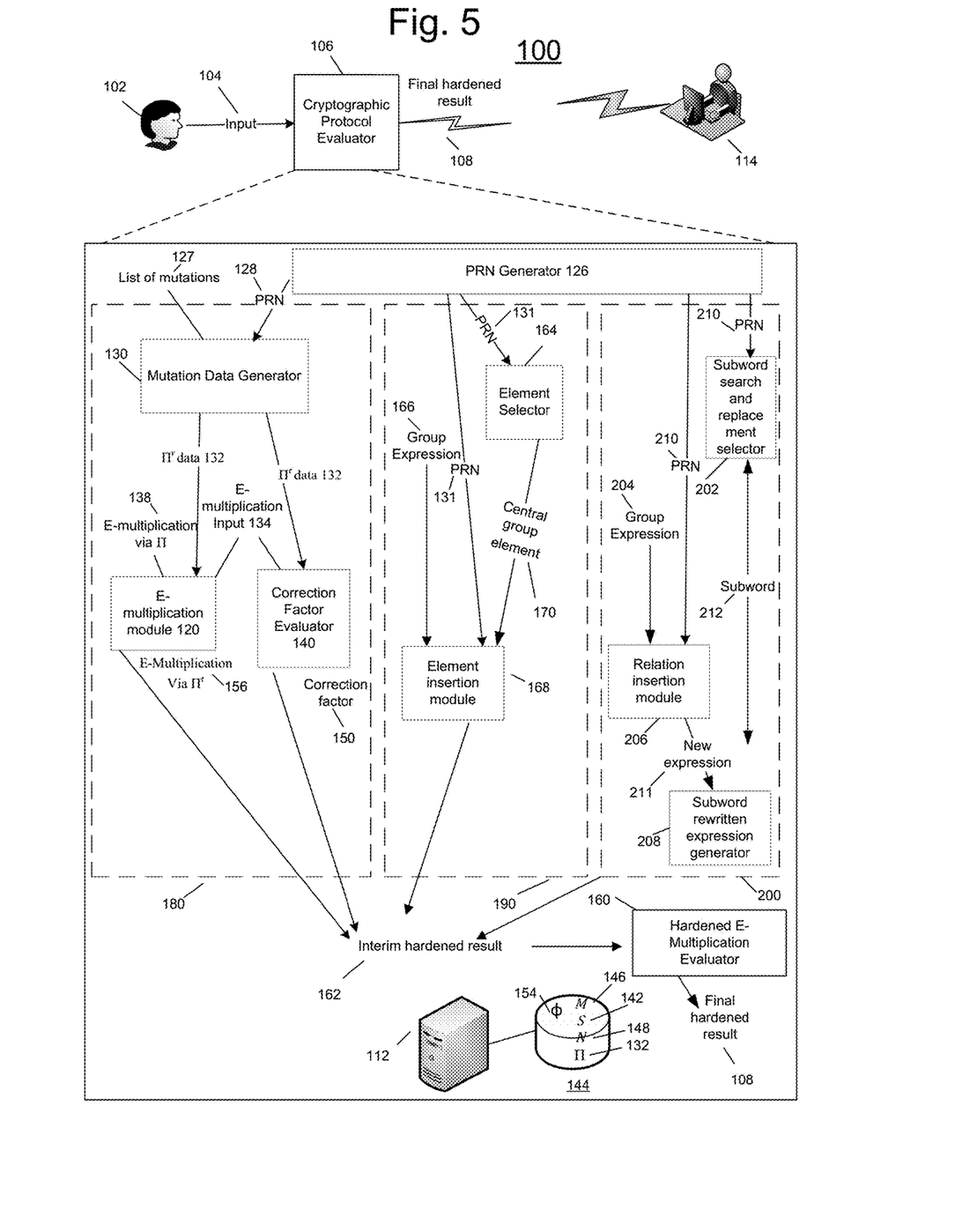
FIG. 5 is a system drawing of a side channel attack prevention system in accordance with an embodiment of the invention.

FIG. 5 is a system drawing of a side channel attack prevention system in accordance with an embodiment of the invention. As shown in FIG. 5, cryptographic protocol evaluator 106 may selectively utilize one or more of function mutation generator 180, element selector generator 190 and/or subword replacement module 200.

Among other benefits, a system in accordance with this disclosure may enable hardened E-multiplication of an ordered pair and a group element. Such hardening may inhibit a malicious actor from successfully performing a side channel attack on an output of the E-Multiplication and may make reversing the E-multiplication infeasible.

Figure 6:
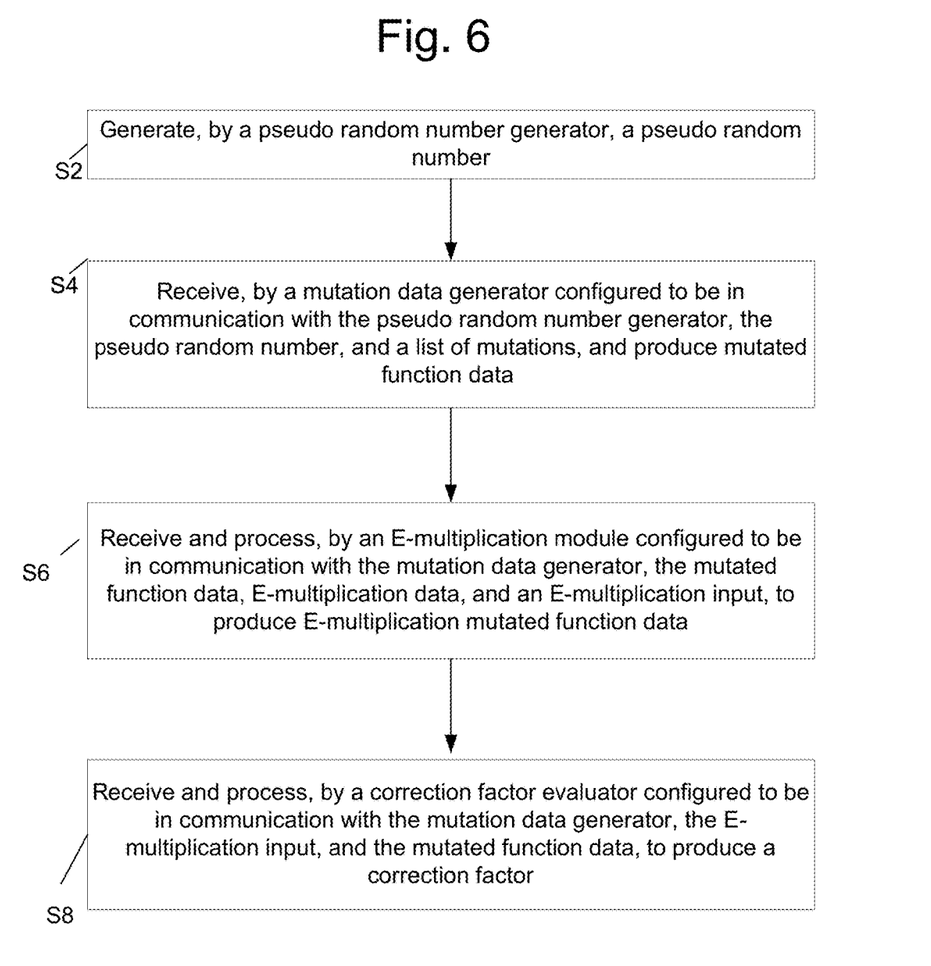
FIG. 6 is a flow diagram illustrating a process which could be performed in accordance with an embodiment of the invention.

Referring to FIG. 6, there is shown a process which could be performed in accordance with an embodiment of the invention. The process could be performed using, for example, system 100 discussed above and may be used to generate a hardened result.

As shown, at step S2, the process may start with "Generate, by a pseudo random number generator, a pseudo random number." The process may continue to step S4, "Receive, by a mutation data generator configured to be in communication with the pseudo random number generator, the pseudo random number, and a list of mutations, and produce mutated function data." The process may continue to step S6, "Receive and process, by an E-multiplication module configured to be in communication with the mutation data generator, the mutated function data, E-multiplication data, and an E-multiplication input, to produce E-multiplication mutated function data." The process may continue to step S8, "Receive and process, by a correction factor evaluator configured to be in communication with the mutation data generator, the E-multiplication input, and the mutated function data, to produce a correction factor" where the hardened result may be based on the E-multiplication mutated function data and the correction factor.

Figure 7:
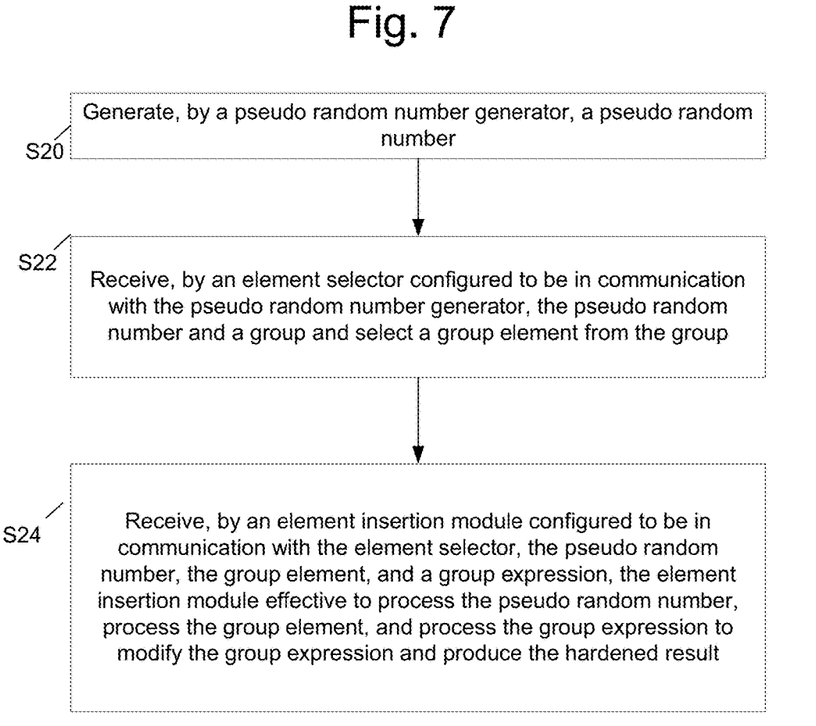
FIG. 7 is a flow diagram illustrating a process which could be performed in accordance with an embodiment of the invention.

Referring to FIG. 7, there is shown a process which could be performed in accordance with an embodiment of the invention. The process could be performed using, for example, system 100 discussed above and may be used to generate a hardened result. As shown, at step S20, the process may start with "Generate, by a pseudo random number generator, a pseudo random number." The process may continue to step S22, "Receive, by an element selector configured to be in communication with the pseudo random number generator, the pseudo random number and a group and select a group element from the group." The process may continue to step S24, "Receive, by an element insertion module configured to be in communication with the element selector, the pseudo random number, the group element, and a group expression, the element insertion module effective to process the pseudo random number, process the group element, and process the group expression to modify the group expression and produce the hardened result."

Figure 8:
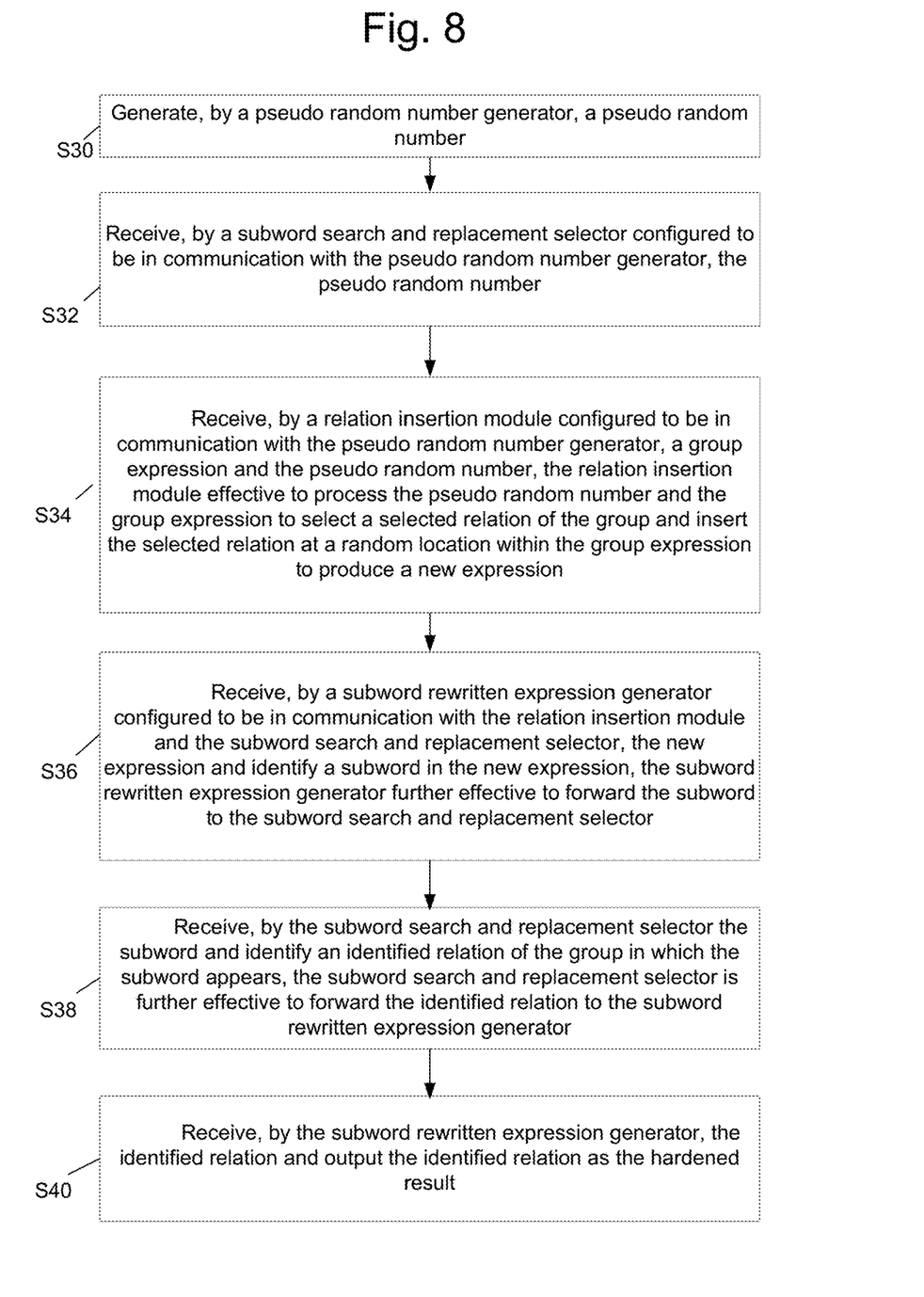
FIG. 8 is a flow diagram illustrating a process which could be performed in accordance with an embodiment of the invention.

Referring to FIG. 8, there is shown a process which could be performed in accordance with an embodiment of the invention. The process could be performed using, for example, system 100 discussed above and may be used to generate a hardened result. As shown, at step S30, the process may start with "Generate, by a pseudo random number generator, a pseudo random number." The process may continue with step S32, "Receive, by a subword search and replacement selector configured to be in communication with the pseudo random number generator, the pseudo random number." The process may continue with step S34, "Receive, by a relation insertion module configured to be in communication with the pseudo random number generator, a group expression and the pseudo random number, the relation insertion module effective to process the pseudo random number and the group expression to select a selected relation of the group and insert the selected relation at a random location within the group expression to produce a new expression." The process may continue with step S36, "Receive, by a subword rewritten expression generator configured to be in communication with the relation insertion module and the subword search and replacement selector, the new expression and identify a subword in the new expression, the subword rewritten expression generator further effective to forward the subword to the subword search and replacement selector." The process may continue with step S38, "Receive, by the subword search and replacement selector the subword and identify an identified relation of the group in which the subword appears, the subword search and replacement selector is further effective to forward the identified relation to the subword rewritten expression generator." The process may continue with step S40, "Receive, by the subword rewritten expression generator, the identified relation and output the identified relation as the hardened result."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system effective to harden an input to produce a hardened result, the system comprising:
   a pseudo random number generator effective to generate a pseudo random number;

a mutation data generator configured to be in communication with the pseudo random number generator, the mutation data generator effective to receive the pseudo random number, receive a list of mutations, and produce mutated function data;

an E-multiplication module configured to be in communication with the mutation data generator, the E-multiplication module effective to receive the mutated function data, receive E-multiplication data, and receive an E-multiplication input, the E-multiplication module being effective to process the mutated function data, process the E-multiplication data, and process the E-multiplication input to produce E-multiplication mutated function data; and a correction factor evaluator configured to be in communication with the mutation data generator, the correction factor evaluator effective to receive the E-multiplication input, and receive the mutated function data, the correction factor evaluator effective to process the E-multiplication input, and process the mutated function data to produce a correction factor;

whereby the hardened result is based on the E-multiplication mutated function data and the correction factor.

2. The system of claim 1, further comprising:
a hardened E-multiplication evaluator configured to be in communication with the correction factor evaluator and the E-multiplication module, the hardened E-multiplication evaluator effective to receive and process the hardened result to produce a final hardened result.

3. The system of claim 1, wherein the E-multiplication input includes an ordered pair and an element.

4. The system of claim 1, wherein the E-multiplication data includes a first monoid, a second monoid, and an action on the first monoid.

5. The system of claim 3, wherein the E-multiplication data includes a first monoid, a second monoid, and an action on the first monoid.

6. The system of claim 1, wherein the correction factor includes a difference between a first component of a first result of E-multiplication on the E-multiplication input, and a second component of a second result of E-multiplication on the mutated function data.

7. The system of claim 1, further comprising:
a hardened E-multiplication evaluator configured to be in communication with the correction factor evaluator and the E-multiplication module, the hardened E-multiplication evaluator effective to receive and process the hardened result to produce a final hardened result; and
wherein the E-multiplication input includes an ordered pair and an element; and
the E-multiplication data includes a first monoid, a second monoid, and an action on the first monoid.

8. The system of claim 7, wherein the correction factor includes a difference between a first component of a first result of E-multiplication on the E-multiplication input, and a second component of a second result of E-multiplication on the mutated function data.

9. A system effective to harden an input to produce a hardened result, the system comprising:
a pseudo random number generator effective to generate a pseudo random number;
an element selector configured to be in communication with the pseudo random number generator, the element selector effective to receive the pseudo random number and a group and select a group element from the group; and an element insertion module configured to be in communication with the element selector, the element insertion module being effective to receive the pseudo random number, the group element, and a group expression, the element insertion module effective to process the pseudo random number, process the group element, and process the group expression to modify the group expression and produce the hardened result.

10. The system of claim 9, further comprising:
a hardened E-multiplication evaluator configured to be in communication with the element insertion module, the hardened E-multiplication evaluator effective to receive and process the hardened result to produce a final hardened result.

11. The system of claim 9, wherein the element selector is effective to select a central group element in the group.

12. The system of claim 9, wherein the group expression is a first group expression, the group is a first group, and the system further comprises:
a mutation data generator configured to be in communication with the pseudo random number generator, the mutation data generator effective to receive the pseudo random number, receive a list of mutations, and produce mutated function data;

an E-multiplication module configured to be in communication with the mutation data generator, the E-multiplication module effective to receive the mutated function data, receive E-multiplication data, and receive an E-multiplication input, the E-multiplication module being effective to process the mutated function data, process the E-multiplication data, and process the E-multiplication input to produce E-multiplication mutated function data;

a correction factor evaluator configured to be in communication with the mutation data generator, the correction factor evaluator effective to receive the E-multiplication input, and receive the mutated function data, the correction factor evaluator effective to process the E-multiplication input, and process the mutated function data to produce a correction factor;

a subword search and replacement selector configured to be in communication with the pseudo random number generator, the subword search and replacement selector effective to receive the pseudo random number;

a relation insertion module configured to be in communication with the pseudo random number generator, the relation insertion module effective to receive a second group expression of a second group and the pseudo random number, the relation insertion module effective to process the pseudo random number and the second group expression, to select a selected relation of the second group and insert the selected relation at a random location within the second group expression to produce a new expression;

a subword rewritten expression generator configured to be in communication with the relation insertion module and the subword search and replacement selector, the subword rewritten expression generator effective to receive the new expression and identify a subword in the new expression, the subword rewritten expression generator further effective to forward the subword to the subword search and replacement selector;

the subword search and replacement selector further effective to receive the subword and identify an identified relation of the group in which the subword appears, the subword search and replacement selector is further effective to forward the identified relation to the subword rewritten expression generator; and the subword rewritten expression generator is further effective to receive the identified relation and output the identified relation;

whereby the hardened result is based on the E-multiplication mutated function data, the correction factor, the modified group expression, and the identified relation.

13. The system of claim 9, wherein element insertion module is effective to modify the group expression by insertion of the group element and an inverse of the group element in the group expression.

14. The system of claim 9, wherein element insertion module is effective to modify the group expression by insertion of the group element in the beginning of the group expression.

15. The system of claim 9, wherein element insertion module is effective to modify the group expression by insertion of the group element at the end of the group expression.

16. The system of claim 9, further comprising:

a hardened E-multiplication evaluator configured to be in communication with the element insertion module, the hardened E-multiplication evaluator effective to receive and process the hardened result to produce a final hardened result;

wherein the element selector is effective to select a central group element in the group; and the element insertion module is effective to modify the group expression by insertion of the group element in the group expression.

17. A system effective to harden an input to produce a hardened result, the system comprising:

a pseudo random number generator effective to generate a pseudo random number;

a subword search and replacement selector configured to be in communication with the pseudo random number generator, the subword search and replacement selector effective to receive the pseudo random number;

a relation insertion module configured to be in communication with the pseudo random number generator, the relation insertion module effective to receive a group expression and the pseudo random number, the relation insertion module effective to process the pseudo random number and the group expression to select a selected relation of the group and insert the selected relation at a random location within the group expression to produce a new expression;

a subword rewritten expression generator configured to be in communication with the relation insertion module and the subword search and replacement selector, the subword rewritten expression generator effective to receive the new expression and identify a subword in the new expression, the subword rewritten expression generator further effective to forward the subword to the subword search and replacement selector;

the subword search and replacement selector further effective to receive the subword and identify an identified relation of the group in which the subword appears, the subword search and replacement selector is further effective to forward the identified relation to the subword rewritten expression generator; and the subword rewritten expression generator is further effective to receive the identified relation and output the identified relation as the hardened result.

18. The system of claim 17, wherein the relation insertion module is effective to insert a cyclic permutation of the selected relation.

19. The system of claim 17, wherein the selected relation is a group generator followed by an inverse of the group generator.

20. The system of claim 17, further comprising:

a hardened E-multiplication evaluator configured to be in communication with the correction factor evaluator and the E-multiplication module, the hardened E-multiplication evaluator effective to receive and process the hardened result to produce a final hardened result.

* * * * *